Patented Sept. 3, 1940

2,213,188

UNITED STATES PATENT OFFICE 2,213,188

DYESTUFFS OF THE ANTHRAQUINONE SERIES

Richard Fleischhauer, Frankfort-on-the-Main-Fechenheim, Germany, assignor to General Aniline & Film Corporation, a corporation of Delaware No Drawing. Application November 16, 1938, Serial No. 240,646. In Germany November 16, 1937

4 Claims. (Cl. 260—374)

The present invention relates to valuable new dyestuffs of the anthraquinone series, more particularly to those of the general formula:

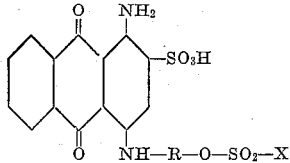

wherein R stands for an aromatic radicle of the benzene series and X stands for a member selected from the group consisting of aliphatic radicles and aromatic radicles of the benzene, naphthalene and hydrogenated naphthalene series.

The new dyestuffs may be prepared for example by condensing 1-amino-4-halogenoanthraquinone-2-sulfonic acid with an aminophenol compound and treating the 1-amino-4-hydroxyarylaminoanthraquinone-2-sulfonic acid thus obtained with an aliphatic sulfochloride or an aromatic sulfochloride of the benzene, naphthalene or hydrogenated naphthalene series. Furthermore the manufacture of the new dyestuffs may also be performed in another sequence by combining aminophenol compounds with sulfonic acid halides of the above said species and condensing the intermediate products thus obtained with 1-amino-4-halogenoanthraquinone-2-sulfonic acid.

The new dyestuffs are distinguished from the known 1-amino-4-hydroxyphenylamino-anthraquinone-2-sulfonic acids which do not contain a radicle of an aliphatic or aromatic sulfonic acid in their hydroxyphenylamino group, by more reddish blue shades of the dyeings obtained on wool and silk and by a considerably increased fastness of these dyeings to washing, fulling, seawater and perspiration. Moreover those of the new dyestuffs which contain the radicle of a substituted aromatic sulfonic acid in their molecule exhibit the valuable property of being absorbed by animal fibers from a neutral bath with an almost complete exhaustion of the dyeing bath.

Most of the new dyestuffs possess, in spite of their great molecular weight, a good solubility in water, especially when they contain long-chain aliphatic radicles. If necessary, the solubility of the new dyestuffs in water may be still further increased by treating the dry dyestuffs with sulfonating agents such as for example sulfuric acid and chlorosulfonic acid and reprecipitating them from the solution in these sulfonating agents by the addition of water.

In order to further illustrate my invention the following examples are given, the parts being by weight and all temperatures in degrees centigrade.

Example 1

38.2 parts of 1-amino-4-bromoanthraquinone-2-sulfonic acid are mixed with 16 parts of p-aminophenol, 600 parts of water, 5 parts of sodium bicarbonate and a little amount of copper powder, and the mixture is stirred at about 50–60° for some hours, until the condensation is complete. Then the solution is alkalized by the addition of sodium carbonate, filtered while hot and from the filtrate the dyestuff formed is precipitated by the addition of sodium chloride.

The intermediate dyestuff thus obtained is purified, if necessary, by dissolving it in water and reprecipitating it from this solution. Then it is again dissolved in about 1000 parts of water, and at about 60° an excess of 3-chlorotoluene-6-sulfochloride is added. The mixture is then stirred for 1–2 hours at about 60–80° with the addition of such an amount of sodium carbonate or sodium hydroxide as necessary for keeping the solution always alkaline. When cool, the dyestuff formed of the formula:

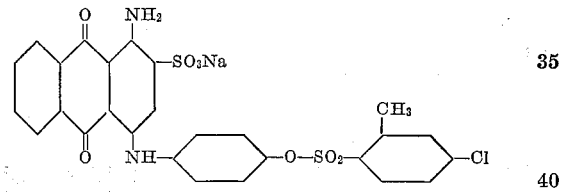

is filtered off and purified by washing or by dissolving it in water and reprecipitating it from this solution. The new dyestuff is, when dry, a dark violet powder, soluble in water and dyeing wool from a weakly acid or neutral bath very fast reddish blue shades.

Similar dyestuffs of likewise very good fastness properties are obtained by employing instead of 3-chlorotoluene-6-sulfochloride other aromatic sulfochlorides of the benzene, naphthalene and hydrogenated naphthalene series, such as for example
4-chloro-benzene-sulfochloride,
4-toluenesulfochloride,
m-xylenesulfochloride,
2,4-dichlorobenzenesulfochloride,
2,5-dichlorobenzenesulfochloride,
3,4-dichlorobenzenesulfochloride,
2-chlorotoluene-4-sulfochloride,
4-chlorotoluene-2-sulfochloride,
3-nitrobenzenesulfochloride,
4-hydroxy-3-carboxybenzenesulfochloride,
2,5-dimethyl-4-chlorobenzene-sulfochloride,
naphthalene-2-sulfochloride,
tetrahydronaphthalene-2-sulfochloride.

*Example 2*

43 parts of the sodium salt of the 1-amino-4-(4'-hydroxy-phenylamino)-anthraquinone-2-sulfonic acid which is prepared according to the first paragraph of Example 1, are dissolved in water and treated at about 50–60° with 17 parts of chloroethanesulfochloride. When the reaction is complete, the solution is filtered and from the filtrate the dyestuff formed of the formula:

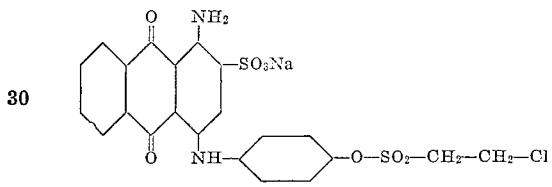

is precipitated by the addition of sodium chloride. It is, when dry, a violet-black powder, soluble in water and dyeing wool and silk blue shades of good fastness to perspiration and very good fastness to light and seawater. The new dyestuff has a good levelling power.

Similar valuable dyestuffs are obtained by employing instead of chloroethanesulfochloride the corresponding amounts of methane-sulfochloride, ethanesulfochloride, propanesulfochloride or chloromethanesulfochloride.

*Example 3*

An aqueous solution of the sodium salt of the 1-amino-4-(4'-hydroxyphenylamino)-anthraquinone-2-sulfonic acid (prepared according to the first paragraph of Example 1) is treated with an excess of 2,4-diisopropylbenzenesulfochloride in an analogous manner as described in Example 1. The new dyestuff thus obtained of the formula:

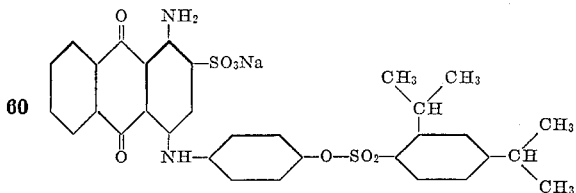

is isolated and dried. It is a dark violet powder, soluble in water and dyeing wool from a neutral bath reddish blue shades of excellent fastness properties.

*Example 4*

38.2 parts of 1-amino-4-bromoanthraquinone-2-sulfonic acid are condensed in an analogous manner as described in the first paragraph of Example 1 with 18 parts of 1-amino-3-hydroxy-6-methylbenzene at about 60–70°, advantageously with the addition of a little amount of alcohol. The intermediate dyestuff thus obtained is isolated, purified and then treated with about 30 parts of 4-toluenesulfochloride at about 50–60° in an aqueous solution containing an excess of sodium carbonate. Thereby a dyestuff is obtained of the formula:

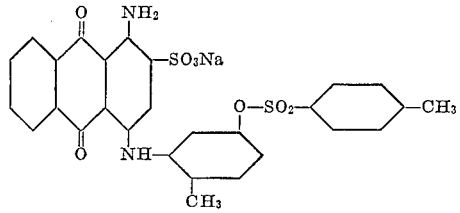

which is, when dry, a violet-black powder. It is slightly soluble in water and dyes wool navy-blue shades of very good fastness properties.

Similar valuable dyestuffs are obtained by treating the condensation products of 1-amino-4-bromoanthraquinone-2-sulfonic acid and 2-aminophenol, 3-aminophenol or 6-aminophenol-2-carboxylic acid with 4-toluenesulfochloride or similar sulfochloride compounds.

*Example 5*

32.2 parts of 1-amino-4-bromoanthraquinone-2-sulfonic acid are mixed with about 1000 parts of water, 5 parts of sodium bicarbonate, 26 parts of the benzenesulfonic acid ester of 4-aminophenol, about 80 parts of alcohol and a little amount of cuprous hydroxide, and the mixture is heated to about 70–80°, until the condensation is almost complete. Then the dyestuff formed of the formula:

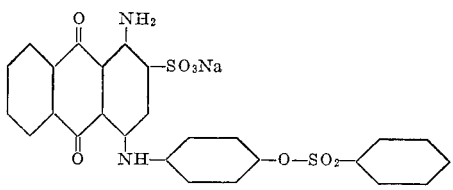

is precipitated and purified, if necessary, by dissolving it in water and reprecipitating it from this solution. It is, when dry, a violet-black powder, soluble in water and dyeing wool from an acid bath blue shades of good fastness to perspiration and very good fastness to seawater.

*Example 6*

43 parts of the sodium salt of the 1-amino-4-(4'-hydroxyphenylamino)-anthraquinone-2-sulfonic acid (prepared according to the first paragraph of Example 1) are treated in an aqueous solution at about 50–60° with 27 parts of isohexyl-toluene-sulfochloride. The new dyestuff thus obtained of the formula:

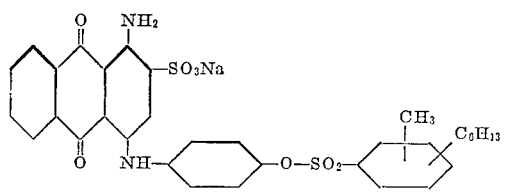

is isolated and dried. It is a dark violet powder, soluble in water and dyeing wool clear reddish blue shades of excellent fastness to washing, fulling and perspiration and of good fastness to light.

The isohexyl-toluenesulfochloride employed for the manufacture of this dyestuff may be prepared for instance by acting with chlorosulfonic acid on isohexyltoluene which is obtained by condensing isohexylene with toluene in the presence of aluminium chloride. Hitherto the positions of the methyl, the isohexyl and the sulfochloride group in the molecule of the isohexyl-toluenesulfochloride have not been found out, but probably the methyl and the isohexyl group stand in m-position to each other.

Similar dyestuffs which in part yield on wool somewhat more reddish blue shades are obtained by employing instead of isohexyltoluenesulfochloride other sulfochloride compounds such as for example:
Isioctyl-toluenesulfochloride,
4-cycylohexylbenzenesulfochloride,
2, 4-dicyclohexylbenzenesulfochloride,
2, 4-diisohexylbenzene-sulfochloride,
2, 4-diisooctylbenzenesulfochloride,
and the like.

*Example 7*

43 parts of the sodium salt of the 1-amino-4-(4'-hydroxyphenylamino)-anthraquinone-2-sulfonic acid (prepared according to the first paragraph of Example 1) are dissolved in water and treated at about 60–90° with a mixture of aliphatic sulfochlorides with chains of 12 to 20 carbon atoms. When the reaction is complete, the new dyestuff formed is isolated and dried. It is a dark powder, easily soluble in water and dyeing wool from an acid bath very fast reddish blue shades.

By employing a mixture of aliphatic sulfochlorides with chains of 6 to 7 carbon atoms or other long-chain aliphatic sulfochlorides such as for example decanesulfochloride similar valuable dyestuffs are obtained, dyeing wool somewhat brighter reddish blue shades of likewise very good fastness properties.

I claim:

1. The dyestuffs of the anthraquinone series of the general formula:

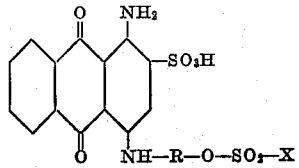

wherein R stands for an aromatic radicle of the benzene series and X stands for a member selected from the group consisting of aliphatic radicles and aromatic radicles of the benzene, naphthalene and hydrogenated naphthalene series, which dyestuffs dye animal fibers blue shades of good fastness to washing, fulling, seawater and perspiration.

2. The dyestuff of the formula:

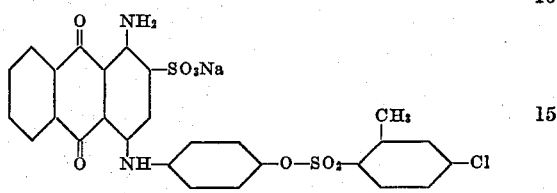

which dyestuff is a dark violet powder, soluble in water and dyeing wool very fast reddish blue shades.

3. The dyestuff of the formula:

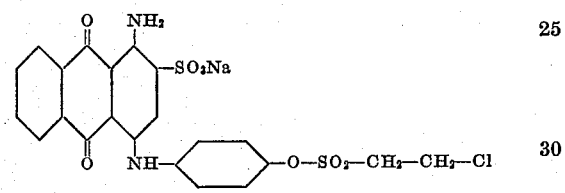

which dyestuff is a violet-black powder, soluble in water and dyeing wool and silk blue shades of good fastness properties.

4. The dyestuff of the formula:

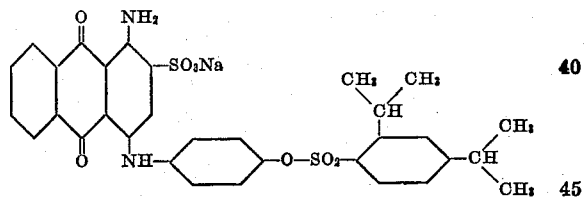

which dyestuff is a dark violet powder soluble in water and dyeing wool reddish blue shades of excellent fastness properties.

RICHARD FLEISCHHAUER.